(No Model.)
J. C. COVERT.
HAME FASTENER.
No. 458,415. Patented Aug. 25, 1891.
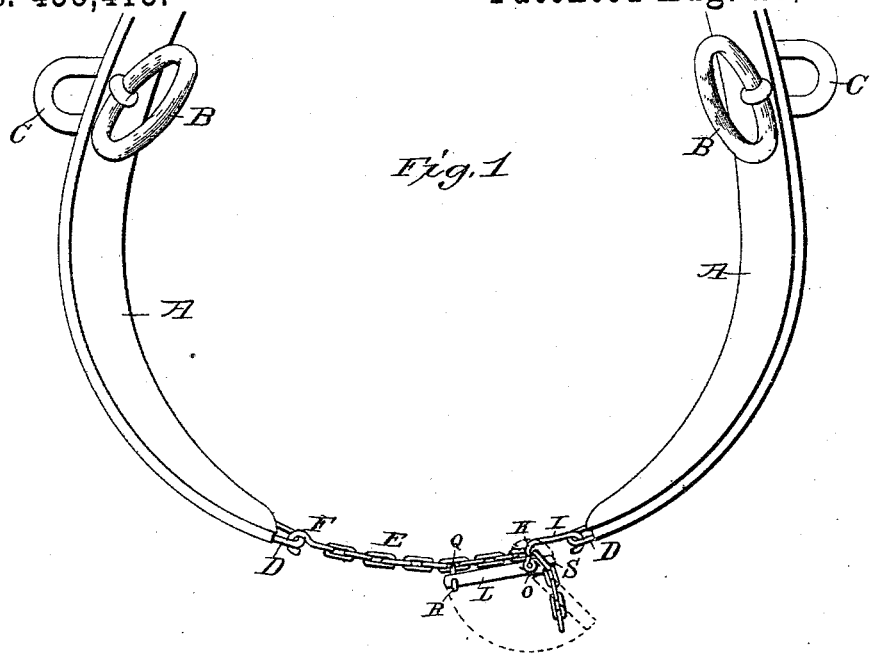
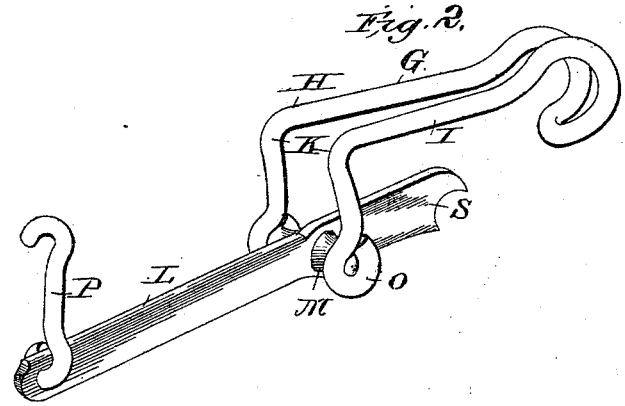
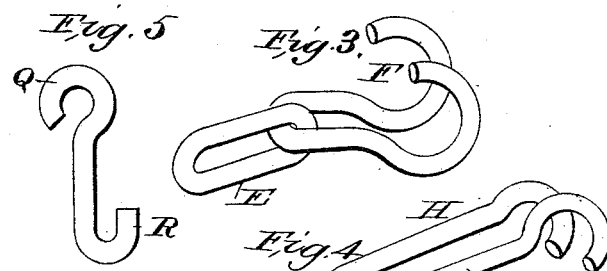
Witnesses:
F. F. Cornwall
G. M. Copenhaver
Inventor,
James C. Covert
by H. A. Toulmin
Attorney.

UNITED STATES PATENT OFFICE.

JAMES C. COVERT, OF WEST TROY, NEW YORK.

HAME-FASTENER.

SPECIFICATION forming part of Letters Patent No. 458,415, dated August 25, 1891.

Application filed March 19, 1891. Serial No. 385,600. (No model.)

*To all whom it may concern:*

Be it known that I, JAMES C. COVERT, a citizen of the United States, residing at West Troy, in the county of Albany and State of New York, have invented certain new and useful Improvements in Hame-Fasteners; and I do hereby declare the following to be a full, clear, and exact description of the invention, such as will enable others skilled in the art to which it appertains to make and use the same.

This invention relates to a certain new and useful improvement in hame-fasteners; and the purpose of the invention is to dispense with the use of straps and buckles common in the ordinary fastener or hame-strap, and also to provide a construction which will prevent the possibility of the animal unfastening the device by rubbing against outside objects.

The structural peculiarities of my improvements will be hereinafter more fully described, and pointed out in the claims.

In the accompanying drawings, forming a part of this specification, and on which like letters of reference indicate corresponding parts, Figure 1 represents a front view of the lower end of a pair of hames with my improved hame-fastener applied thereto; Fig. 2, a detail enlarged perspective view of the lever-bail, the lever itself, and one form of securing-hook; Fig. 3, a detail perspective view, on an enlarged scale, of the hame-hook. Fig. 4 is a similar view to Fig. 2, showing a modification; and Fig. 5, one form of latch.

The letter A designates a pair of hames of the ordinary or any approved type, having the usual breast-chain rings B, the trace-eyes C, and the strap or chain eyes D at the lower ends of the hames. So far the devices are of the common or any approved kind.

The letter E designates a chain for fastening together the lower ends of the hames, the length of such chain to be sufficient to accommodate, say, the largest hames, or hames carried by the maximum size of collars, the connection of the operating-lever with the chain being adjustable or transferable from link to link, so as to adjust the device to the particular pair of hames with which it may be desired to use it.

The letter F designates a hook, preferably of the type more clearly shown in Fig. 3, from which it will be seen to have two hooked portions proper and a double-body part, such part forming a cross-bar, on which the first link of the series is hung. This hook or double hook is engaged with the eye D of the hames.

The other eye D of the hames is engaged by a bail or hook G, an enlarged detailed view of which is shown in Fig. 3. From this figure it will be seen that the hook proper of this bail or hook is double and that there are two members H and I to the body part and a suitable cross-connection between the ends of the device. In Fig. 2 this cross-connection is constituted of a cross-pin or trunnions forming the pivot of the lever, as will hereinafter be described, while from Fig. 4 it will be observed that the cross portion of the hook or bail G is constituted of a part J, which is integral with the body of the hook or bail. In Fig. 2 the ends of the wire of which the hook or bail is made terminate at the cross portion. In Fig. 4 the ends of the wire of which the hook or bail is made terminate at the hook ends proper. Either form may be used, any choice between them being left to the manufacturer. In both forms it will be observed that the body parts H I are turned at K at a convenient angle, so as to locate the cross portion or pivot of the lever sufficiently remote from the collar that the short end of the lever may swing without interfering with or being interfered with by the collar. This lever is shown at L, and may be of either of the types shown in Figs. 2 and 4. In Fig. 2 the lever is provided with trunnions M, preferably cast therewith, malleable iron being the material. In such form the trunnions are received in eyes O, made by turning the ends of the bail, and the ends of the trunnions are slightly upset to prevent dislocation. I do not wish to be understood as limiting myself to this form of pivot for the lever nor to this material, but suggest it as a desirable construction. In the form shown in Fig. 4 the lever L is mounted directly on the cross portion of the bail, such portion constituting the point of oscillation.

Some device must be employed to prevent the lever from flying back after it has been moved to lock position, as shown in Fig. 1. I employ for this purpose a device consisting of a latch P, either carried by the lever, as seen in Fig. 2, and arranged to engage at its other end with the chain or some other part of the structure, or carried by the chain or some other part of the structure and arranged to engage with the lever, as shown in Fig. 1. In this latter arrangement the latch P has a partially-closed eye Q, which engages with one of the links, and a loop R, which slips over the lever. The user will place the eye about the link best suited, according to the length of the chain between the ends of the hames. He will then close the eye to keep the latch from being lost. Provision for this is made because of the wide range of sizes of collars and hames. The eyes of the hooks F and G are also closed by the user when he applies the device to his hames. The short arm of the lever is notched at S to receive a link. In using the device the short end of the lever is swung to the position shown in dotted lines in Fig. 1. The lever is then swung to the position shown in full lines, during which movement the short arm of the lever will draw upon the chain and pass between the members H and I of the hook or bail G, carrying a link or two or more of the chain with it. The long end of the lever is then secured as by engaging the latch P with it, or the latch with the chain or other part of the structure if the latch be carried by the lever.

Among the peculiarities of my improvements may be mentioned the following: The offset position of the pivotal point in the hook or bail G of the lever; the wide range of the adjustability of the device to suit the wide range in the sizes of collars and hames; the carrying of the lever by a hook or bail, itself to be carried by one of the hames; the adjustability of the connection between the lever and the chain or other part of the structure to hold the lever in locked position, and the freedom of the lever from liability from being struck or rubbed against outside objects by reason of its position, such position being remote from the lower portions of the hames, which are most likely to be brought against outside objects, and also the applicability of the device to hames as ordinarily constructed, so that no change has to be made in the hames to accommodate them to my fastener.

Having thus described my invention, what I claim as new, and desire to secure by Letters Patent, is—

1. In a hame-fastener, the combination, with a chain adapted to engage at one end with a hame, of a lever having its short arm adapted to engage with a link of that chain, a hook or bail pivoted to said lever and adapted to connect with the other hame and having bearings offset from the line of strain for the lever-pivots, whereby space is provided for the short end of the lever and the adjacent part of the engaging-chain to swing inward past the collar, and a connection for the longer end of the lever to hold it in a locked position.

2. In a hame-fastener, the combination, with a bail or hook, the body part being divided into two members and having an outward bend in the same to offset their ends away from the line of strain, of a lever located between said members and having trunnions mounted in said offset ends of the bail or hook, and a chain for connecting the lever with the hame, and a hook for locking the lever.

3. As an improved article of manufacture, the herein-described hame-fastener, the same consisting of a hook F, having an open eye, a bail or hook G, having an open eye and offset at K outward from the line of strain, and a lever L, pivoted to the hook or bail G in the offset portion and arranged to engage by its short arm with one or the other of the links of the chain F, the short arm being adapted to swing inward, but clear of the collar, and a latch Q to connect the lower longer arm of the lever with the chain E when in a locked position.

In testimony whereof I affix my signature in presence of two witnesses.

JAMES C. COVERT.

Witnesses:
WM. A. EASTERDAY,
L. S. BACON.